(12) United States Patent
Hemphill et al.

(10) Patent No.: US 7,866,983 B2
(45) Date of Patent: Jan. 11, 2011

(54) SURGICAL SIMULATOR SYSTEM

(75) Inventors: William K. Hemphill, Johnson City, TN (US); J. Paul Sims, Greeneville, TN (US); Martin E. Olsen, Johnson City, TN (US); Martin P. Eason, Johnson City, TN (US); Sheldon R. Davis, Nashville, TN (US)

(73) Assignee: East Tennessee State University Research Foundation, Johnson City, TN (US)

( * ) Notice: Subject to any disclaimer, the term of this patent is extended or adjusted under 35 U.S.C. 154(b) by 988 days.

(21) Appl. No.: 11/623,716

(22) Filed: Jan. 16, 2007

(65) Prior Publication Data

US 2007/0166681 A1 Jul. 19, 2007

Related U.S. Application Data

(60) Provisional application No. 60/758,896, filed on Jan. 13, 2006.

(51) Int. Cl.
G09B 23/28 (2006.01)
(52) U.S. Cl. .................. 434/262; 434/268; 434/272
(58) Field of Classification Search ........... 434/262, 434/268, 272
See application file for complete search history.

(56) References Cited

U.S. PATENT DOCUMENTS

| 4,003,141 | A | * | 1/1977 | Le Roy | 434/270 |
| 5,199,877 | A | * | 4/1993 | Page | 434/262 |
| 5,945,056 | A | | 8/1999 | Day et al. | |
| 5,951,301 | A | | 9/1999 | Younker | |
| 6,273,728 | B1 | * | 8/2001 | van Meurs et al. | 434/268 |
| 6,527,558 | B1 | * | 3/2003 | Eggert et al. | 434/262 |
| 6,780,016 | B1 | | 8/2004 | Toly | |
| 7,182,602 | B2 | * | 2/2007 | Lakin et al. | 434/262 |
| 2003/0138764 | A1 | | 7/2003 | Gil et al. | |

FOREIGN PATENT DOCUMENTS

GB 2 324 902 11/1998

* cited by examiner

*Primary Examiner*—Cameron Saadat
(74) *Attorney, Agent, or Firm*—Denise M. Everett

(57) ABSTRACT

Disclosed is a surgical simulator for teaching, practicing, and evaluating surgical techniques. Such a simulator may comprise a cassette of organs, blood vessels, and tissues that may be disposable. The simulator also comprises a hemodynamic simulator and a frame assembly, the frame assembly providing support for the cassette of organs as well as a fluid conduit through which simulated blood flow from the hemodynamic simulator may be connected to the blood vessels of the organs and related tissues. The hemodynamic simulator provides adjustable and variable pressures to the arteries and veins, as well as variable pulse rates, which can be programmed at settings chosen by an instructor or user.

15 Claims, 14 Drawing Sheets

SURGICAL SIMULATOR SYSTEM

CROSS-REFERENCE TO RELATED APPLICATIONS

This application claims the benefit of earlier-filed U.S. Provisional Application No. 60/758,896, filed Jan. 13, 2006.

FIELD OF THE INVENTION

The invention relates generally to models for surgical simulation. More specifically, the invention relates to surgical simulation systems comprising simulated tissue.

BACKGROUND OF THE INVENTION

Part of surgical training comprises assisting surgeons in performing surgeries and performing surgeries during surgical residency under the supervision of a more experienced surgeon. A surgeon may be faced with a variety of different types of excisions, repairs, and other types of surgery during his/her career. Therefore, it is of great benefit to have an opportunity to perform surgeries of different types and of differing degrees of difficulty during training. Unfortunately, in many training programs there are not as many opportunities to perform certain types of surgeries as would ideally be desired. In certain parts of the country, in underdeveloped areas, and in smaller hospitals or training programs there may be fewer opportunities to assist or perform some types of surgeries.

In the field of gynecological surgery, for example, surgeons may perform vaginal hysterectomies, abdominal hysterectomies, bladder injury repair, removal of an ectopic pregnancy, morecellation of the uterus, or oophrectomy, for example. It would be of great benefit to a surgical trainee to have an opportunity to assist with or, preferably, to perform these types of surgeries as part of the surgical training. In some training programs, however, there are not enough of these procedures performed in the training hospital to provide an opportunity for each trainee to perform them in sufficient number to achieve a greater degree of proficiency.

Anatomical models have been described for use in medical teaching settings.

SUMMARY OF THE INVENTION

The invention comprises a simulator for teaching, practicing, and evaluating gynecological surgical techniques, comprising an anatomical cassette formed of representative organs, tissues, and blood vessels of an anatomical system, a hemodynamic simulator for controlling the rate and pressure of simulated blood in blood vessels of the anatomical cassette, and a frame assembly for supporting the anatomical cassette and providing a conduit for fluid from the hemodynamic simulator to the anatomical cassette, the hemodynamic simulator being fluidly connected to the frame assembly and the anatomical cassette being fluidly connected to the frame assembly. In certain aspects, the anatomical cassette may also comprise tissues and organs normally found in proximity to the organs and tissues of the anatomical system in the human or animal body. For example, an anatomical cassette representing the human female reproductive system may also comprise peritoneum, omentum, and other tissues generally positioned proximally to the human female reproductive system in the human body. Anatomical cassettes generally may additionally comprise ligaments to provide attachment to the frame assembly and blood vessels to be fluidly connected to the hemodynamic simulator.

In some aspects, the invention comprises a surgical simulator comprising a frame assembly and a hemodynamic simulator, the frame assembly being fluidly connected to the hemodynamic simulator. The surgical simulator may also comprise an anatomical cassette fluidly connected to the hemodynamic simulator. The surgical simulator may also comprise a recording system. In some embodiments, the recording system may comprise at least one visible/infrared spectrum camera.

The invention also comprises a hemodynamic simulator for anatomical models and surgical simulators, the simulator comprising at least one air compressor and at least one pressurized fluid reservoir or accumulator. A hemodynamic simulator may also comprise at least one regulator. In one aspect, a hemodynamic simulator of the invention provides variable pressure flow of simulated blood to simulated arteries and continuous pressure flow of simulated blood to simulated veins. Aspects of the invention also provide a hemodynamic simulator wherein the simulator is programmable to provide variable pulse and blood pressure rates.

In various embodiments, the invention also provides a surgical simulator comprising a frame assembly to support and to be fluidly connected to at least one anatomical cassette and at least one hemodynamic simulator, the hemodynamic simulator being fluidly connected to the frame assembly, the frame assembly providing a conduit through which fluid may flow from the hemodynamic simulator to the anatomical cassette. The hemodynamic simulator may comprise at least one air compressor and at least one pressurized fluid reservoir or accumulator, the hemodynamic simulator being programmable to provide variable pulse and blood pressure rates.

DETAILED DESCRIPTION

Figure 1:
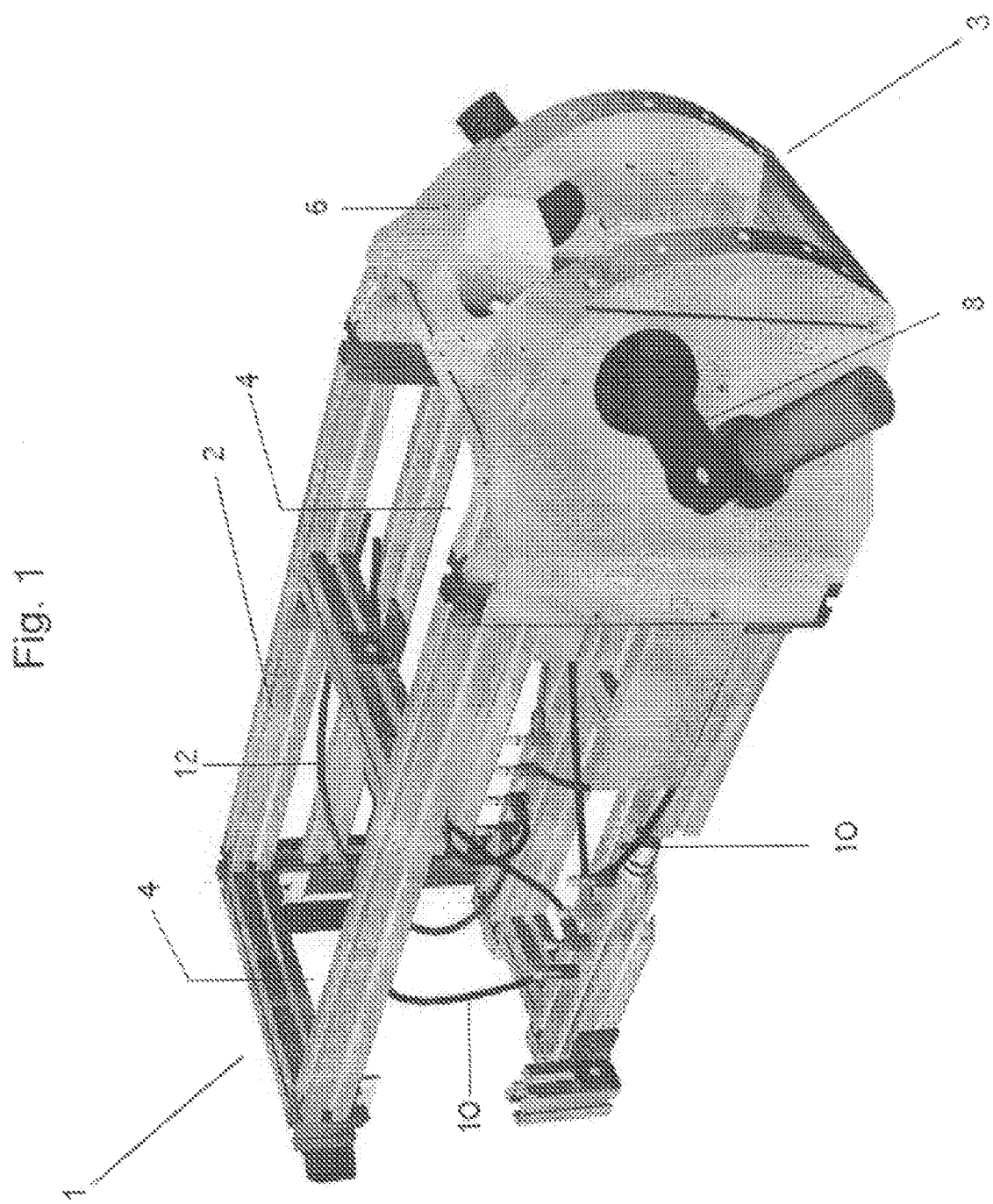
FIG. 1 is a 3-dimensional view of a frame assembly 2 of the invention, comprising a first end 1 corresponding to the superior portion of the abdominopelvic cavity and a second end 3 corresponding to the inferior portion of the abdominopelvic cavity. A simulated pelvis 6 is shown attached to the inferior portion of the frame assembly 2.

The inventors have developed a simulator comprising a system and method for teaching, practicing, and evaluating surgical techniques. The system and method may be used in a variety of settings, including surgical residency programs, continuing medical education programs, and seminars and conferences where new surgical techniques are taught. The system also provides advantages, in terms of interchangeability of parts and cost-effectiveness, for use in both teaching and in testing and certification programs. In one embodiment, the system comprises a physical model of one or more organs of a human reproductive system, along with associated blood vessels and ligaments (a "anatomical cassette"). For example, an anatomical cassette may comprise the human uterus and organs and related tissues either associated with the uterus in the female human reproductive system (e.g., ovaries, fallopian tubes, ligaments) or closely associated with the uterus in the space of the abdomen, such as the bladder, peritoneum, etc.

As used herein, an anatomical cassette comprises one or more target organs for use in a surgical simulation, optionally but preferably in association with corresponding tissues, ligaments, and blood vessels. A hemodynamic simulator is a system for transporting fluid (i.e., simulated blood) to the anatomical cassette to provide variable pressure in the arterial vessels and continuous pressure in the venous vessels, these conditions more accurately simulating conditions within a human or animal body that must be taken into account when dissecting and ligating blood vessels during surgery. A recording system comprises at least one camera operably associated with the anatomical cassette to record the actions and skills of one or more individuals utilizing the surgical simulator. In one embodiment, a recording system comprises at least one (and preferably 2-3) visible/infrared spectrum cameras placed to record the simulated surgery as it would occur within a human or animal body—an area which is generally inaccessible to view in a living human or animal.

A hemodynamic simulator associated with the anatomical cassette can provide varying pressure in the arterial vessels and continuous pressure in the venous vessels, as well as a variety of pulse rates. The system may be controlled by the user (student or instructor, for example) to provide practice situations in which blood pressure, pulse, etc. are varied. Computer monitoring of pressure differential may also provide feedback to a user to indicate how efficiently and quickly the appropriate blood vessels have been cut and suture-ligated. The hemodynamic simulator provides realistic blood flow, pressures and pulse rates for simulated blood.

Also combined with the anatomical cassette may be a recording system comprising one or more cameras, videotape, digital recording, or other video and/or audio components, to allow the procedure to be recorded for later review. In one embodiment, a component of the system may comprise a voice recording system for recording student or instructor commentary in a teaching setting. Cameras placed near, and/or embedded within, the organ system provide the opportunity to record the procedure. In environments of lower light, cameras with infrared capability, or cameras that may be combined with illuminating components such as one or more compact infrared light sources, such as an LED, may be used to record the procedure. This offers a distinct advantage over surgical practice in a living human or animal, where it is impractical or impossible to place cameras within the tissue for evaluation purposes.

The system provides interchangeable parts (i.e., organs and related tissues) to provide opportunities to teach surgical management of specific pathologies, providing a greater variety of learning experiences for the surgical resident, practicing surgeon desiring to learn a new technique, etc. In one embodiment, a surgical simulator may be provided comprising a frame assembly and a hemodynamic simulator, with a variety of anatomical cassettes so that one or more users may choose various surgical scenarios, anatomical anomalies, etc., to operably connect to the frame assembly, the chosen anatomical cassette being disposable upon completion of a surgical practice procedure. An anatomical cassette as described by the invention, particularly when combined with the hemodynamic simulator, may also be useful for testing or certification programs. In the case of human uterine anomalies, for example, the anatomical cassette can simulate specific pathologies such as uterine enlargement, uterine fibroids, ovarian masses and ectopic pregnancy.

In one embodiment, a system is provided for surgical practice in performing a hysterectomy. In such a system, for example, a physical model of the uterus, ovaries, vagina, cervix, associated ligaments, and associated blood vessels may be presented to the surgical student to provide an opportunity to practice the techniques necessary to perform an abdominal or a vaginal hysterectomy. Simulated peritoneum may be formed by covering the uterus and bladder with a thin layer of a clear, non-reactive flexible material such as RTV silicone (e.g., DAP aquarium sealant) or a petroleum-based polymer sealant (e.g., Liquid Nails® Clear Seal All-Purpose Sealant). Model blood vessels are provided with simulated blood, and the fluid is provided utilizing a hemodynamic simulator that may vary the pressure of the fluid flow through the blood vessels. A single-, dual-, or multi-stage compressor is used to create a pressure differential to maintain a controlled pressure equivalent or similar to human blood pressure in the blood vessels. Even during blood loss the unit will maintain the required pressure. Use of off-loading pressure valves allows the system to maintain a continuous pressure and flow and acts as a constant pressure supply point. As the surgery is performed, the combined anatomical cassette, hemodynamic simulator and recording system provide the student with the opportunity to better understand the techniques, procedures, and instruments required to perform surgery on such tissues, including, but not limited to, incisions, blunt and sharp dissections, retraction, and manipulation. The student is also provided with an opportunity to cut and ligate the associated blood vessels that would be cut and ligated during a hysterectomy in a human subject, for example, the procedure being performed under conditions that simulate the potential to "bleed out" if the student does not efficiently and quickly perform the ligation. The pressure of the pumped blood substitute stresses the ligations sufficiently to determine whether or not the student has correctly tied off the blood vessel.

There are two major surgical techniques associated with performance of a hysterectomy. For an abdominal hysterectomy, the uterus is removed through an incision (about 15 cm long) in the abdomen. The incision is made either horizontally just above the pubic bone or vertically from just below the umbilicus down to the pubic bone. For a vaginal hysterectomy, the uterus is removed through an incision at the top of the vagina, leaving no external scar. Vaginal hysterectomy may also be performed laparoscopically.

Briefly, in a total vaginal hysterectomy, for example, a weighted speculum is placed into the vagina. The cervix is grasped with a toothed tenaculum, and injected with an appropriate anesthetizing composition (e.g., 1% Xylocalne with 1:200,000 epinephrine). The cervix is circumferentially incised with a scalpel and the bladder dissected off the pubovesical cervical fascia anteriorly using Metzenbaum scissors. The anterior cul-de-sac is entered sharply. The same procedure is performed posteriorly and the posterior cul-de-sac is entered.

A Heaney clamp is placed over the uterosacral ligaments on either side, and the ligaments are transected and suture ligated. The cardinal ligaments are then clamped on both sides, transected and suture ligated. The uterine arteries and the broad ligament are clamped with Heaney clamps, then transected and suture ligated on both sides. The cornua are clamped with Heaney clamps and transected to deliver the uterus. The pedicles are then suture ligated.

When performing a total abdominal hysterectomy, the surgeon separates the muscles of the anterior abdominal wall in the midline by sharp and blunt dissection. Clamps are placed on the cornua and used for retraction. The round ligaments on both sides are clamped, transected and suture ligated, and the anterior leaf of the broad ligament is incised along the bladder reflection to the midline from both sides. The bladder is then gently dissected off the lower uterine segment and the cervix with a sponge stick.

The infundibulopelvic ligaments on both sides are clamped, transected and suture ligated. The uterine arteries are then skeletonized bilaterally, clamped, transected and suture ligated. Uterosacral ligaments are then clamped on both sides, transected, and suture ligated. The cervix and uterus are amputated, and vaginal cuff angles are closed with Vicryl and transfixed to the ipsilateral cardinal and uterosacral ligaments. The remainder of the vaginal cuff is closed with sutures.

In an anatomical cassette as described by the invention, a model human uterus, for example, may be formed of a pigmented, pourable silicone with a shore A hardness of about 10 to about 30, and more preferably about 10. Smooth-On (Easton, Pa.) Dragon Skil flexible silicone with a shore A hardness of 10, for example, provides a formed model organ that exhibits the resistance to cutting that is exhibited by the muscular uterus. Other pourable or injectable casting materials that could be used include flexible polyurethane elastomer with a shore A hardness of about 35 to about 40, such as Freeman FMSC 1035, or even gelatin stabilized with preservatives such as glycerin.

To form the blood vessels, silicone tubing with an outer diameter of about 0.180 inch to about 0.186 inch and an inner diameter of about 0.129 inch to about 0.135 inch may be used. Silicone tubing (Specialty Silicone Fabricators, Paso Robles, Calif., product number 132183, SSF-METN-052 material), made of with an internal diameter of 0.132 inch and an outer diameter of 0.183 inch, for example, provides an appropriate model blood vessel for use in a system for teaching surgical techniques related to the performance of a hysterectomy. An inert, non-reactive and slippery fluid such as mineral oil, for example, preferably with added color so that the "bleeding" can be better visualized by the student as the procedure is performed, provides a model blood substitute that closely approximates the consistency of blood for purposes of performing the surgical simulation. Even more preferable for use in the invention, however, is a simulated blood composition comprising water with added coloring(s), the types of colorings available for use in an aqueous composition generally being more non-toxic than those used with compositions such as mineral oil.

Ligaments, such as the ovarian ligament (which anchors the ovary medially to the uterus), the suspensory ligament (which anchors the ovary to the pelvic wall), the lateral cervical (cardinal) ligaments (which extend from the cervix and superior part of the vagina to the lateral walls of the pelvis), the uterosacral ligaments (which secure the uterus to the sacrum posteriorly), and the round ligaments (which bind the uterus to the anterior body wall), for example, may be formed by compositing pourable silicone with silicone tubing in a wrapping of latex-free, flexible, self-adhesive first aid wrap such as, for example, Nexcare™ No-Hurt Tape (3M, St. Paul, Minn.), Gentle Tape (CVS Pharmacy, Inc., Woonsocket, R.I., or Hurt-Free™ (Johnson & Johnson, New Brunswick, N.J.).

To form the organ(s) and associated blood vessels, ligaments and other tissues for a physical model as used in the system for teaching surgical techniques for hysterectomy, a negative mold may be utilized.

The invention provides a frame assembly 2 as illustrated in FIG. 1 for supporting "consumable" or "disposable", as well as reusable, simulated organs provided in an anatomical cassette. In one embodiment, the frame assembly 2 may be formed of extruded, slotted metal (e.g., t-slotted aluminum) or polymer manifolds, generally 2×1 inch, with a passage such as a cylindrical passage throughout the length of the manifold. The frame assembly may comprise a first end 1 representing a superior end of the abdominopelvic cavity 4, for example, and a second end 3 representing an anterior end of the abdominopelvic cavity 4. Attached to the second end may be a pelvis 6 optionally provided with at least one femur head 8 to provide attachment means for at least one leg to more realistically simulate the conditions associated with a surgery in the abdominopelvic cavity. Organs of the anatomical cassette are located in the abdominopelvic cavity 4 and supplied with simulated blood via at least one simulated vein 10 and at least one simulated artery 12.

Figure 2:
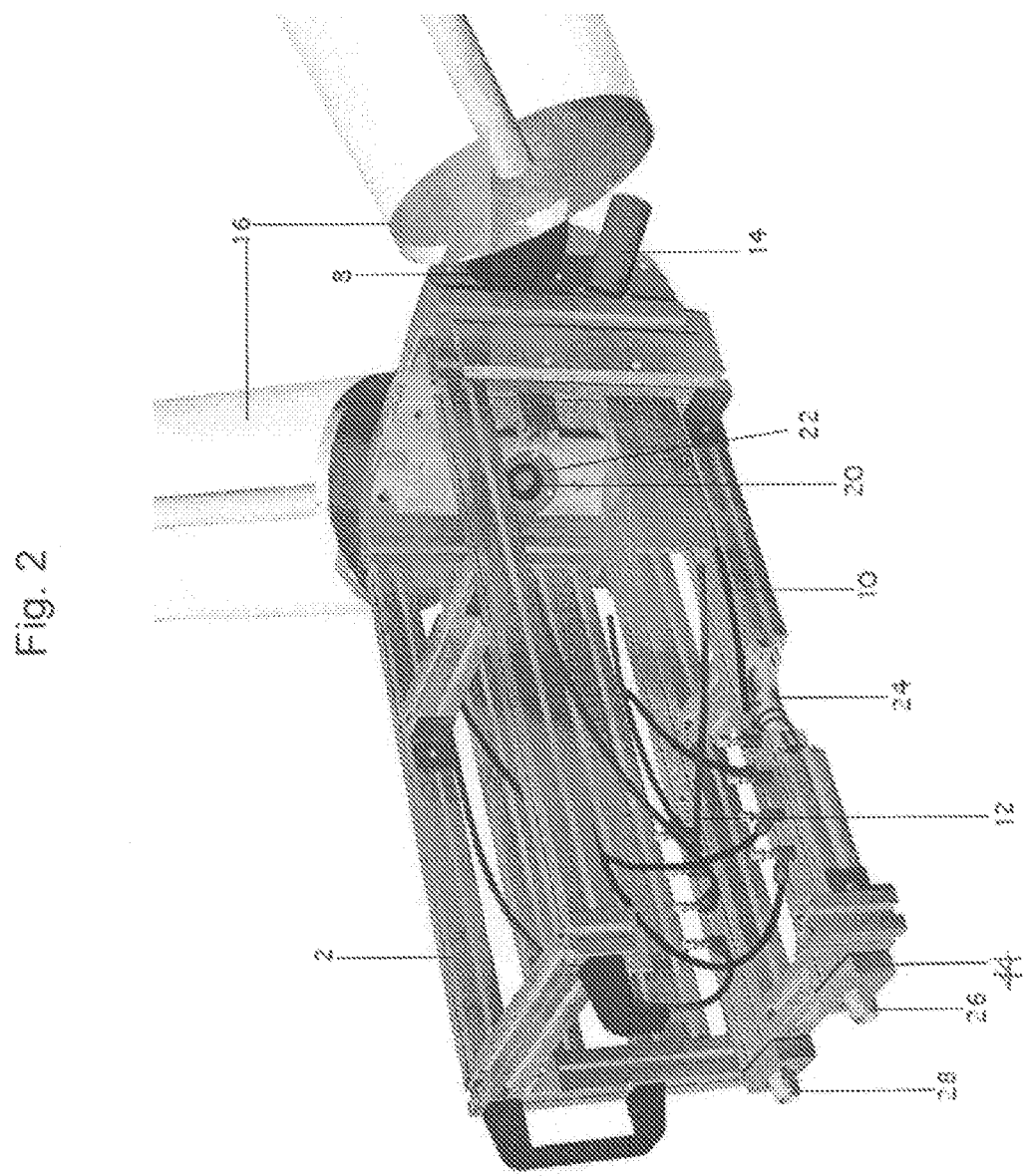
FIG. 2 is a 3-dimensional view with partial cutaway 24 of a frame assembly 2 of the invention with pelvis 6 attached and leg 16 attached to the pelvis via femur head 8.

As illustrated in FIG. 2, at least one leg 16 may be attached via a femur head 8 to allow the leg(s) to be manipulated to be placed in stirrups, for example, to simulate the angle at which the legs may be positioned during surgery. Variable flow manifold fittings 44 fluidly connect venous blood supply 26 and arterial blood supply 28 from the hemodynamic simulator to the anatomical cassette via quick-connect couplings 26. At least one internal cylindrical plug 43 in the cylindrical passage of the manifold is used to reduce the internal volume of the cylindrical passage. An visible/infrared spectrum camera lens assembly 20 may be placed within a ring 22 comprising one or more infrared LEDs so that the surgical simulation may be monitored and recorded. One or more cameras and/or sound recording devices may be positioned as desired by the student or instructor, for example, to allow contemporaneous viewing of the process of the simulation or to record the process for viewing later. In one example, a camera mount may comprise a partial spherical sectional ring 22 of approximately 0.25-inch thickness containing a camera assembly (e.g., Sony, CCD 342) and four infrared emitter diodes (GaAs) (LEDs) of size T13/4 (5 mm) and wavelength 850 nm or 940 nm, for example, mounted in a circular array angled out at approximately 10 degrees. Infrared emitter diodes may be obtained, for example, from Ligitek Electronics, Taipei, Taiwan (product number LVIR3333) or Lite-On, Milpitas, Calif. (product number LTE-3376).

Figure 3:
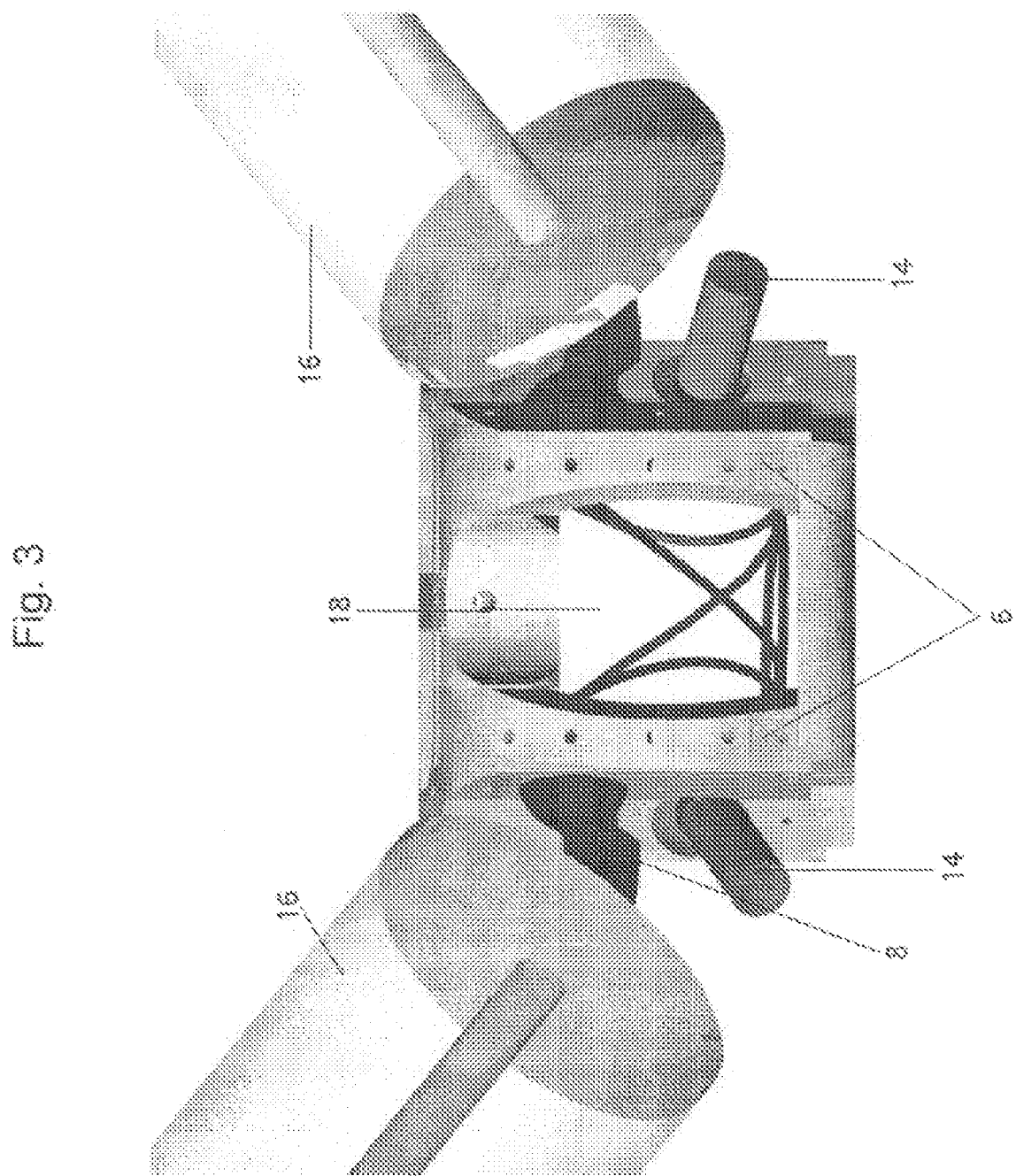
FIG. 3 is a 3-dimensional view with cutaway 24 of a second end of the frame assembly 2 corresponding to the inferior portion of the abdominopelvic cavity with pelvis 6 attached, providing an attachment means (femur head 8) for simulated legs (leg assemblies) 16.

As illustrated in FIG. 3, which provides a view of the second end of the frame assembly corresponding to the inferior surface of the abdominopelvic cavity with pelvis 6 attached, at least one camera 14 is attached to the frame assembly, the pelvis 6 or other support structure either forming a part of the support for the anatomical cassette or provided separately and placed at various angles, for example, to record the surgical simulation. Within a pelvic space 18 of the pelvis 6 may be positioned a reusable or disposable vagina/vulva assembly to provide a realistic texture and consistency to the simulated tissue associated with the anatomical cassette. (Male anatomical parts may be substituted and positioned in the pelvic space for simulations of surgical procedures that are gender-specific for males, for example.) The left-hand and right-hand sides of the pelvis may each contain partial spherical cups for accepting the femur head and camera mount (outside surface), slotted channels and threaded holes for securing abdominal skin (anterior surface) and vulva, and an attachment interface for attachment of the pelvis to the frame assembly.

Figure 4A:
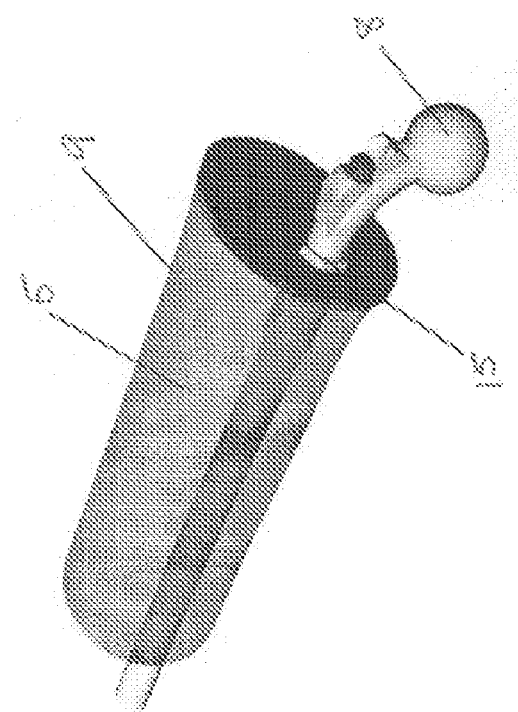
FIG. 4a and FIG. 4b are 3-D side views of a leg assembly 16, with attachment to the femur head 8.
Figure 4B:
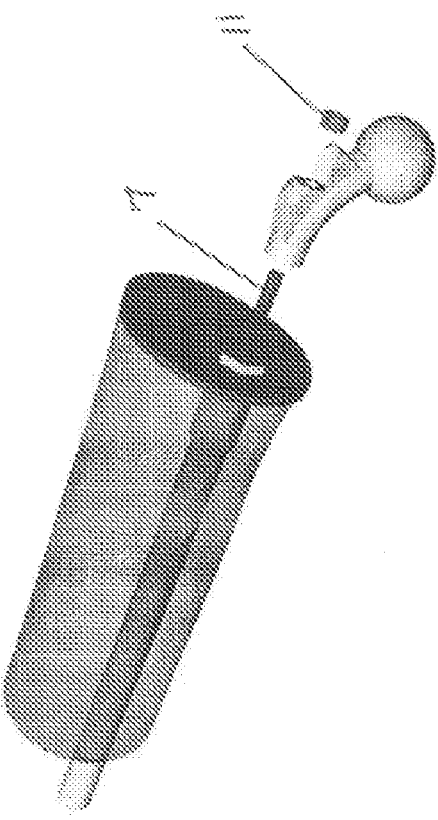

A leg assembly is shown in the drawings of FIGS. 4a and 4b, where a femur head 8 with rounded end to provide a simulated ball-and-socket attachment of the leg to the pelvis is provided at a proximal end of the leg and a lower leg and foot may optionally be provided at a distal end of the leg. In FIG. 4a and FIG. 4b, only the upper portion of the leg (i.e., surrounding the femur) is shown. As FIG. 4 illustrates, a leg assembly 16 may be formed by forming a cylinder comprising one or a variety of materials. For example, a cylindrical support representing the femur 5 may be surrounded by fiberfill batting, foam, or other material enclosed within nylon mesh or, for example, a segment of ladies' pantyhose. In the example shown in FIG. 4, an attachment means is provided by a PVC plug 15 with an included 1⅛-inch hex head body (LASCO Fittings, Inc. P/N 449-007RMC) into which is secured a ⅜-16 stud 7 of approximately 2½ inches in length. Other PVC fittings may comprise standard ¾-inch diameter PVC Pipe and fittings. In one embodiment, a femur bone comprises ¾" PVC tubing, 16 in. long and a PVC plug/threaded stud assembly passes through a base formed of pressed fiberboard, ¼-inch thick and the polypropylene, for example, cover of a polyester-filled neckroll pillow insert 5 inches in diameter by 14 inches in length (Hancock Fabrics 35352 23111) forming the thigh. The leg assembly 16 may then be attached to the femur head 8 with a ⅜-16 UNC nut 11. An outer covering surrounding the leg assembly is made of one leg of sheer pantyhose comprising 83% nylon and 17% spandex (L'eggs, Burlington, N.C., Size B, Suntan). In one embodiment, a knee joint may be hinged or formed of 45° Bend ¾-inch PVC, and is operably connected to a lower leg formed of ¾-inch PVC tubing, 16 inches long and caped on the distal end. The knee/lower leg is useful for positioning the leg assembly and is press fit onto distal end of femur so the upper leg can lay flat (for abdominal procedures) with no knee/lower leg or the upper/lower leg assembly may be placed in stirrups (for vaginal procedures). Each leg assembly is held in place using a friction fit ball and socket type joint. The base is a nominal 2-inch diameter cup built into the pelvis side and the leg assembly is secured with a plate with a matching diameter. Two threaded fasteners are used to control the pressure of the ball joint to restrict movement. The ⅜-16-UNC threaded fastener holding the femur PVC "bone" and the femur head together may be fixed inside the tubing (e.g., a threaded stud) and may be secured to the femur head with a nut.

Figure 5:
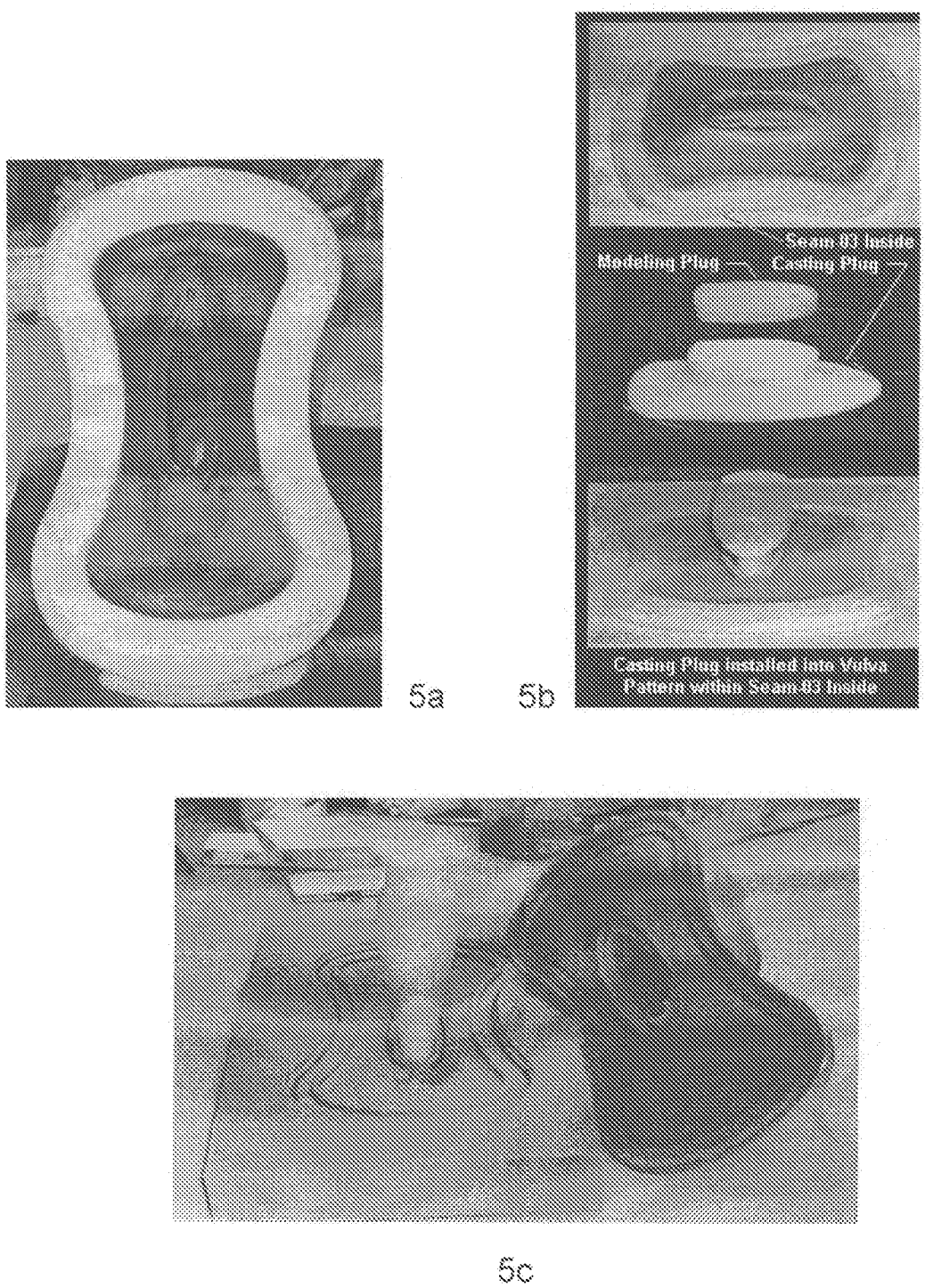
FIGS. 5a-5c is a series of photographs illustrating one process for preparing a vagina/vulva cassette for attachment to a pelvis 6.

FIG. 5 illustrates, via a series of photographs 5a-5c, an example of a mold for forming a vagina/vulva assembly for attachment to the pelvis within the vaginal space. A glove mold may also be used to form one or more organs or tissues of the anatomical cassette, such as the vulva/vagina construct. Briefly, flexible, stretchable tubular netting material is pulled over the mold and pigmented Dragon Skin silicone, for example, is then painted on in a generally uniform manner. The desired part typically cures in the position in which it is originally placed and painted, or may be dip cast. The net result may be increased thickness at the base of the desired organ, which may be preferable for certain simulated organs.

Figure 6:
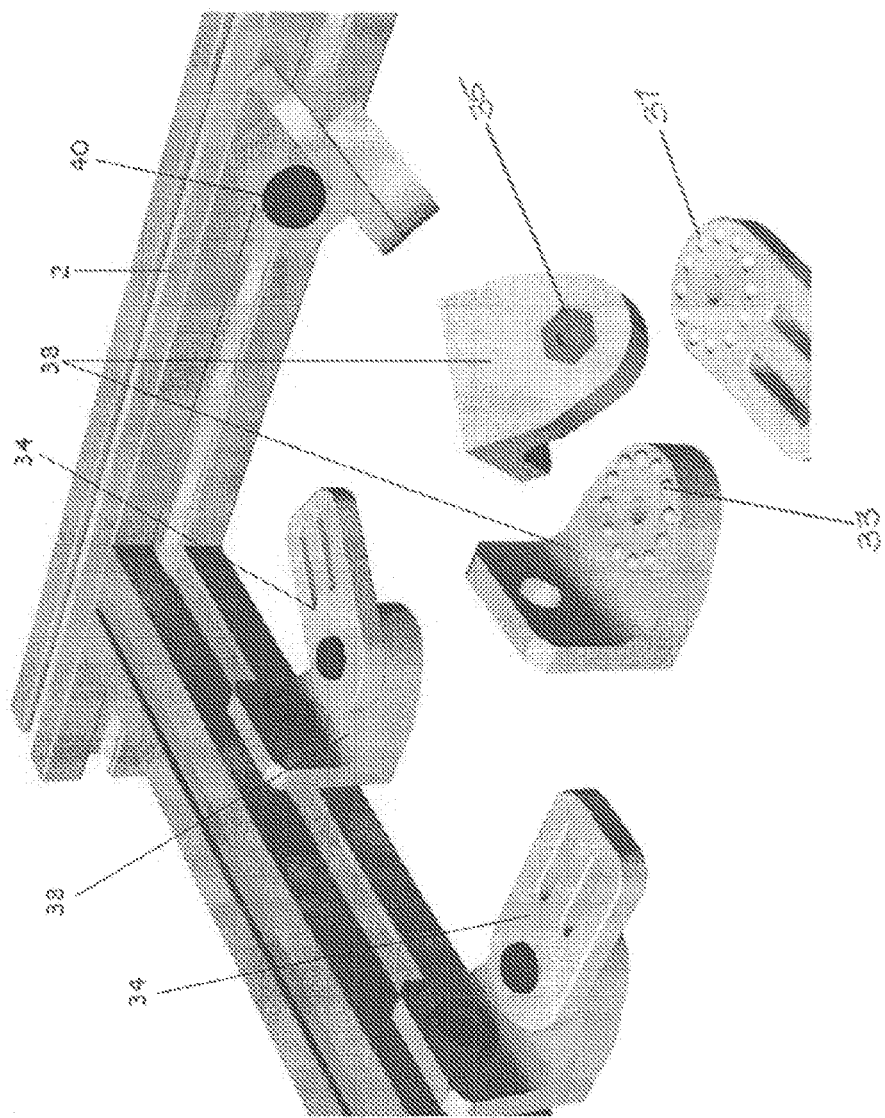
FIG. 6 is a drawing of several views of attachment devices for securing simulated ligaments to the frame assembly 2.

FIG. 6 illustrates attachment means for attaching ligaments to the frame assembly 2, the attachment means comprising a base 38 having a set of spherical protrusions 33 and a nut 35 pressed into the base for a screw. Each holder 34 has a set of corresponding dimples 37. The ligament is threaded through the slots back upon itself (e.g., like a knapsack buckle) to lock and securely hold the ligament at the appropriate position during procedures. The bases and corresponding holders can be placed and oriented on the frame assembly as desired depending upon the size of the organ and the desired pathology.

Figure 7:
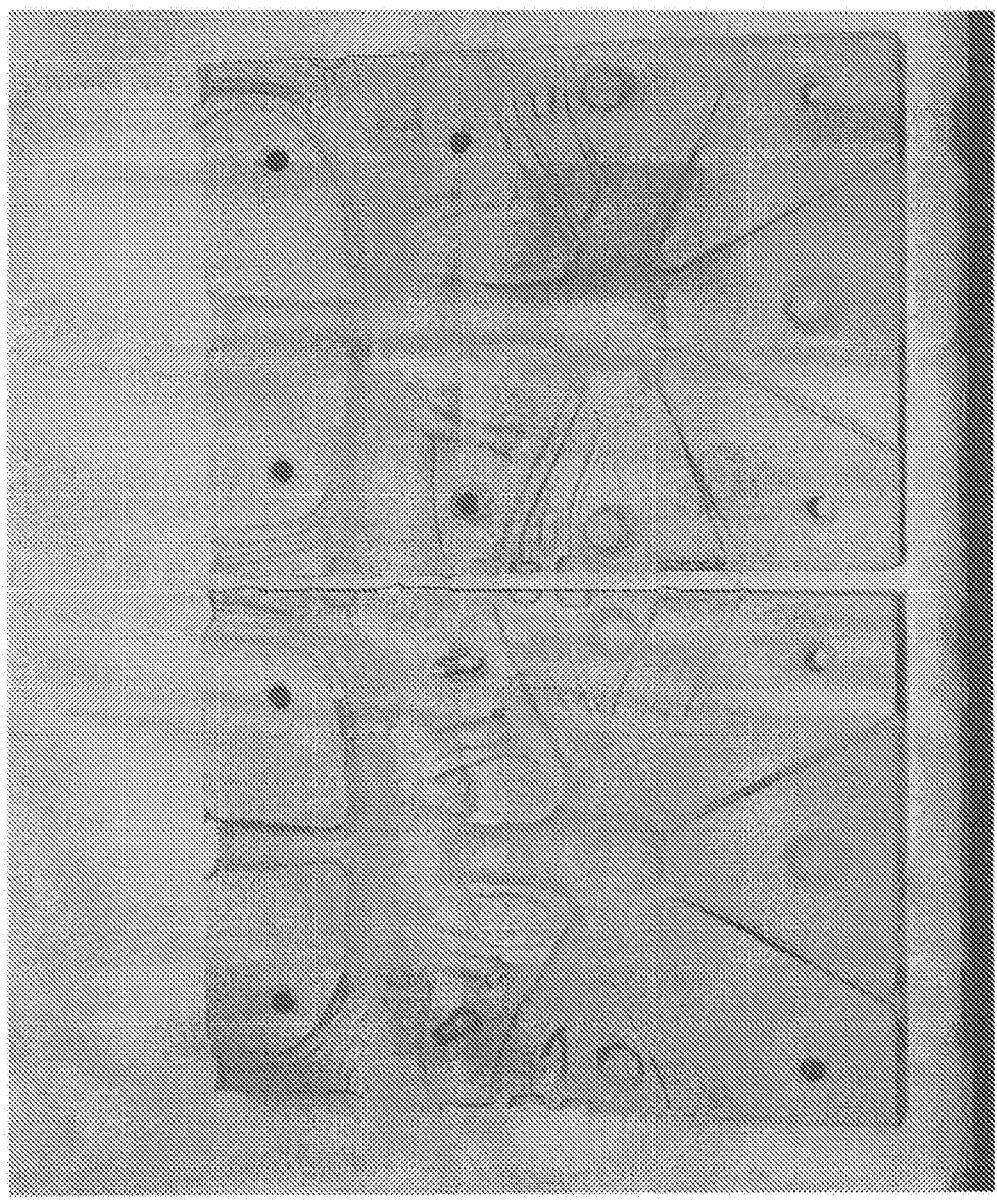
FIG. 7 is a photograph of a negative mold for use in forming organs of the female reproductive system for attachment to a frame assembly 2 to form a surgical simulator of the invention.
Figure 8:
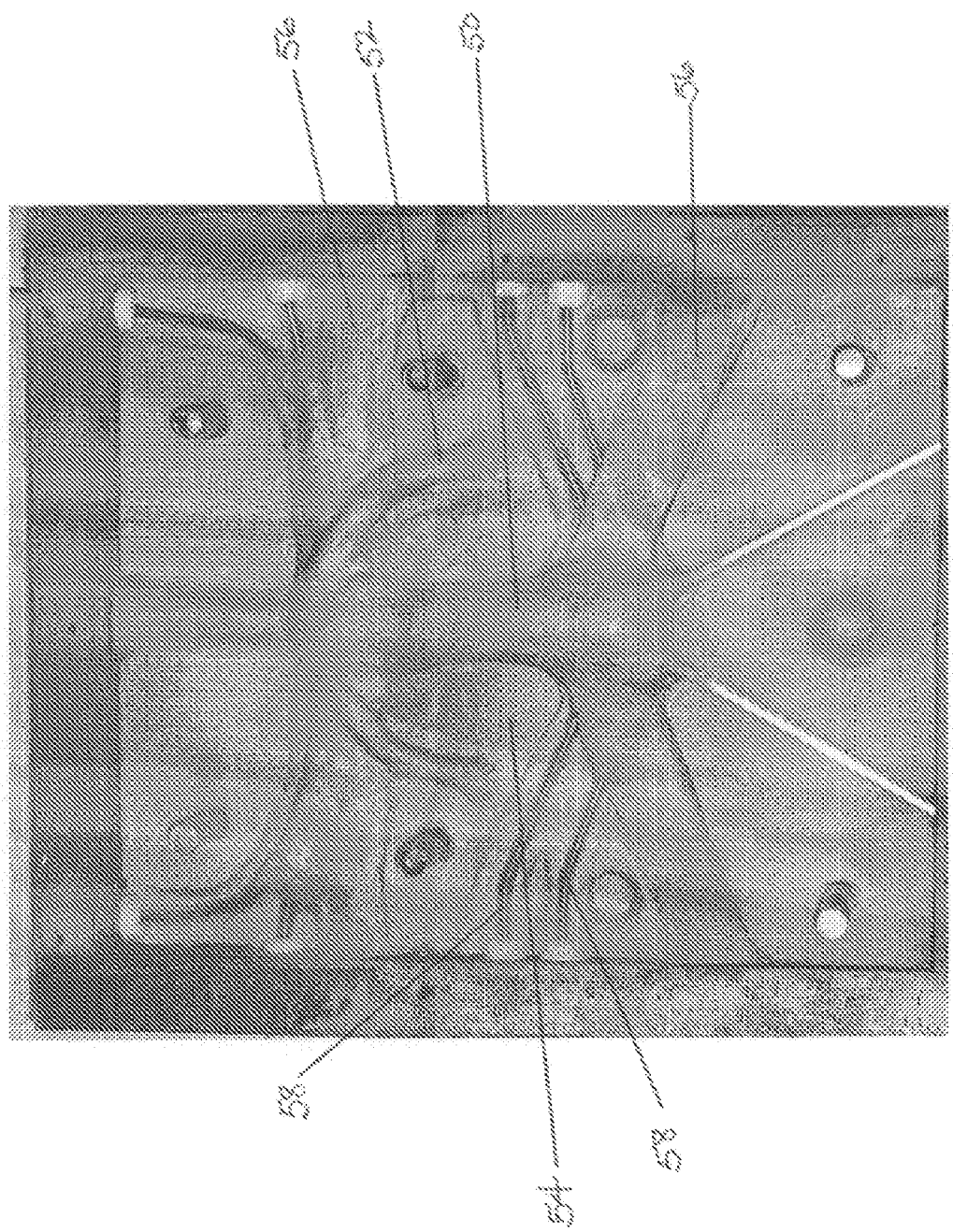
FIG. 8 is a photograph of organs and ligaments having been formed in a mold, with one of the two portions of the mold removed.

FIG. 7 is a photograph of two halves of a negative mold used to form reusable or disposable organs for attachment to a frame assembly. FIG. 8 is a photograph of an anatomical cassette comprising a uterus, fallopian tubes, ovaries, associated ligaments, and blood vessels, having been formed within a negative mold, with one half of the mold removed. Formed as part of the organ system, a ligament becomes a part of the system so that it must be cut away from the uterus during the surgical removal of the uterus from the adjacent support system to which the ligament is attached.

Figure 9:
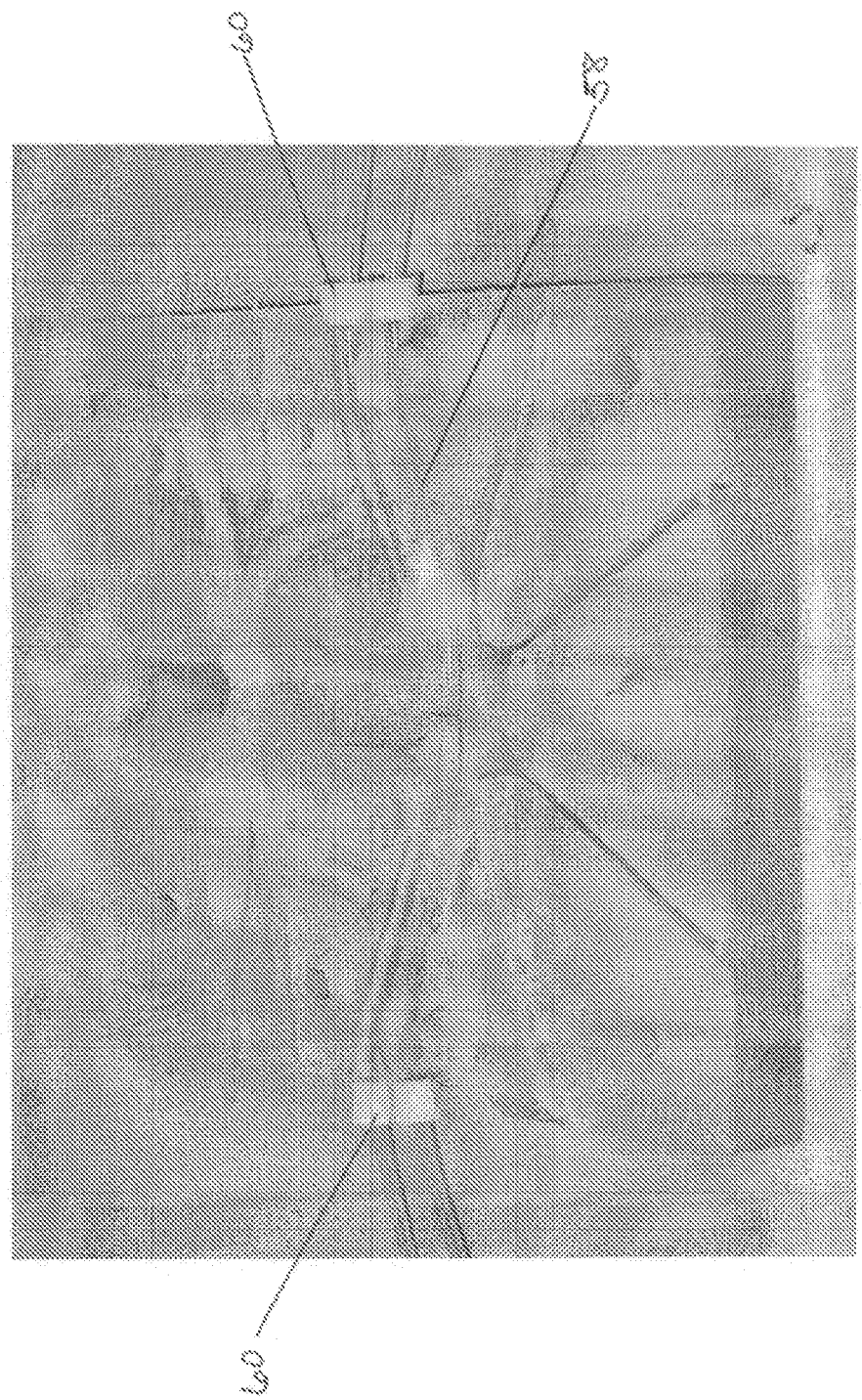
FIG. 9 is a photograph of a negative mold for use in forming organs for use in a surgical simulator of the invention, illustrating a method for incorporating simulated blood vessels into the simulated tissue.

Since the blood vessels should be positioned within the organ, yet accessible for attachment to the pumping system, tubing representing the blood vessel 58 may be inserted within an indention or groove in the mold as shown in FIG. 9. If the ends of the tubing are inserted through individual 1-hole stoppers (Sargent-Welch, Buffalo, N.Y.), as shown in FIG. 9, the stoppers being fit snugly into holes or channels from the interior to the exterior of the mold as shown in FIG. 9, the tubing can be held in place yet extend outside the mold as polyurethane, for example, is poured into the mold and allowed to set. Similarly, material such as stretchable bandaging may be used to form the ligament(s) and may be positioned into a suitable groove into the mold so that a ligament is integrally connected to the organ when the physical model is formed.

Once ligament and blood vessel materials are positioned appropriately within a first or a second of two halves of a mold as shown in FIG. 7, the halves are securely fastened together using, for example, bolts to fit and hold the halves securely together so that pourable polyurethane, for example, may be introduced into the mold, where it surrounds the ligament and blood vessel materials and thereby incorporates them into the physical model of the organ system.

A model vagina may be made by loosely stretching a nominal 6 inch length of tubular elastic dressing size #3 (for arm/leg/hand/foot) stretchable net material (e.g., Surgilast® #3, P/N: GL-703, Western Medical, Ltd. Tenafly, N.J. or Flexinet® #3, Derma Sciences, Inc. Princeton, N.J.) over a mandrel with both ends of the netting stretched over and beyond the mandrel ends. Where a latex-free product is desired, Surgilast® Latex-free #3 tubular elastic dressing retainer may be used. A uniform layer of Dragon Skin silicone, for example, is coated over the netting material, which also provides a barrier between the skin of the individual using the simulation model and the simulated tissues. A vaginal mandrel is a glove-type mold (see FIG. 5c) of about 4.5 inches in length with a non-uniform cross-sectional shape that begins with a spherical diameter of about 1.06 inches, transitions through a series of diameters from an minimum of about 1.11 inches to a maximum of about 1.44 inches and back down to 1.38 inches, then smoothly transitions into an series of elliptical sections with an maximum ellipse size of a major diameter of about 2 inches and a minor diameter of about 0.58 inches at a length of about 3.5 inches from the top, necks down to a major diameter of about 1.96 inches and a minor diameter of about 0.58 inches and then ends in an elliptical section with a major diameter of about 4.5 inches and a minor diameter of about 1.25 inches and of about 0.35 inches in height. While the mandrel is suspended from the top, a thin (0.07±0.02) layer of pigmented, flexible polyurethane material (e.g., the same material that has been described for the uterus model) may be applied uniformly to the vertical surfaces and allowed to cure.

The external genitalia (vulva) aspect of the model female reproductive organ system is made using an open negative mold with the labia majora and minora in the bottom of the mold (FIG. 5c). Prior to casting the model, the vaginal mandrel (FIG. 5c) in inserted through the open mold with the uncoated tubular netting of the lower end of the model vagina positioned within the mold such that the vaginal netting will be covered during casting. The material of the model vulva may generally be the same pourable, flexible casting material (e.g., silicone, polyurethane, gelatin, etc.) used for the uterus and vagina, but may be pigmented to represent model flesh.

After the model uterus and vagina/vulva models have been formed, they may be joined together by applying a thin coating of the same pourable, flexible polyurethane to the head of the cervix and the upper, spherical end of the vagina and allowing the upper end of the vagina to "snap fit" over the cervical head. After this material has been allowed to cure, the uterus/vagina/vulva model will form a unitary construction.

A model bladder may be incorporated into the anatomical cassette. For example, an ultrasound instrumentation condom filled with 20 cc of water and tied off may be positioned on top of the uterus above the cervical/vaginal interface. The model bladder and uterus may then be covered with a thin, uniform layer of silicone (aquarium sealant, RTV, etc.) or other non-reactive sealant applied by brush to simulate the peritoneum.

In one embodiment, a recording system of the simulator uses three video cameras mounted to the simulation frame. These cameras can transmit both visible and near infrared (IR) signals. The cameras are ringed by a set of near infrared diodes wired in parallel fashion with current limiting resistors. The ring of IR lights provides an illumination of the cavity. The cameras are then able to show how the surgeon is manipulating his hands and carrying out procedures in cavities with no visible light present. The surgeon's hand manipulations are recorded by the video system and converted to a black and white signal. As the cavity is opened or exposed to visible light the cameras will automatically switch between IR and visible recording in a seamless manner. One embodiment may include a wireless, head-mounted camera unit capable of recording activities from the surgeon's point of view as well as a wireless microphone for recording conversations and equipment alarms.

Figure 10:
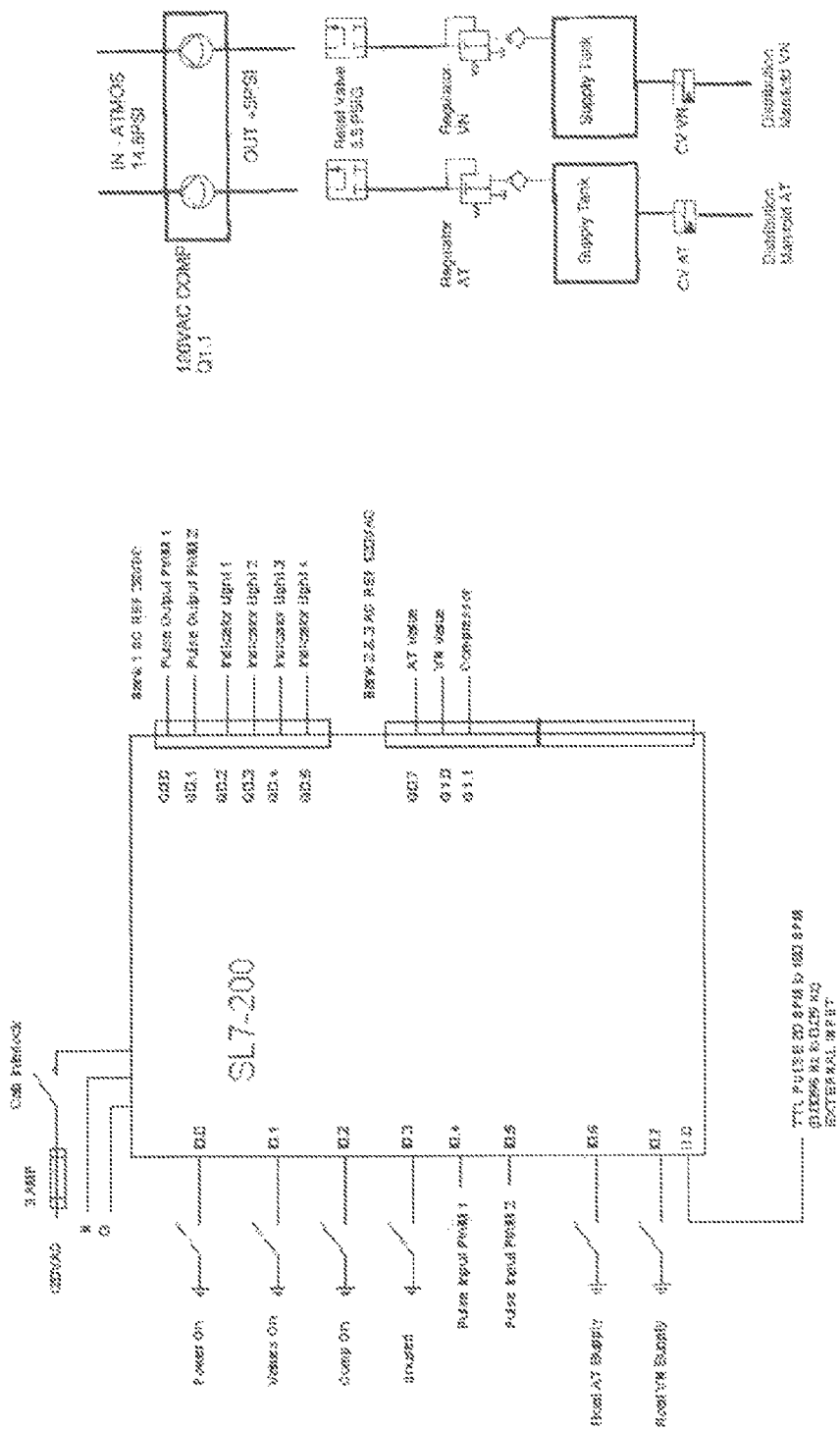
FIG. 10 is a schematic illustrating components of a hemodynamic simulator of the invention.
Figure 11:
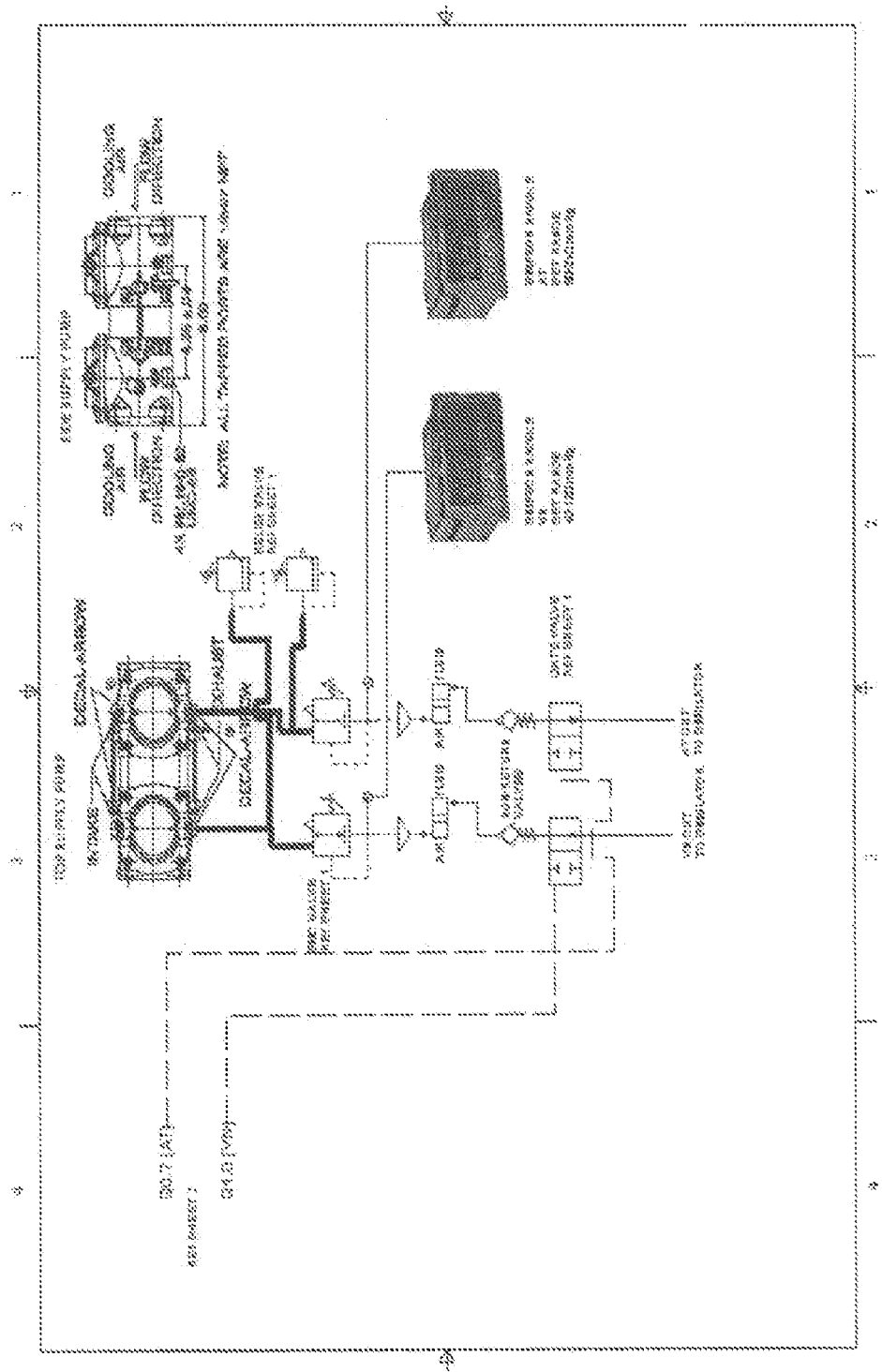
FIG. 11 is a schematic describing a hemodynamic simulator of the invention.
Figure 12:
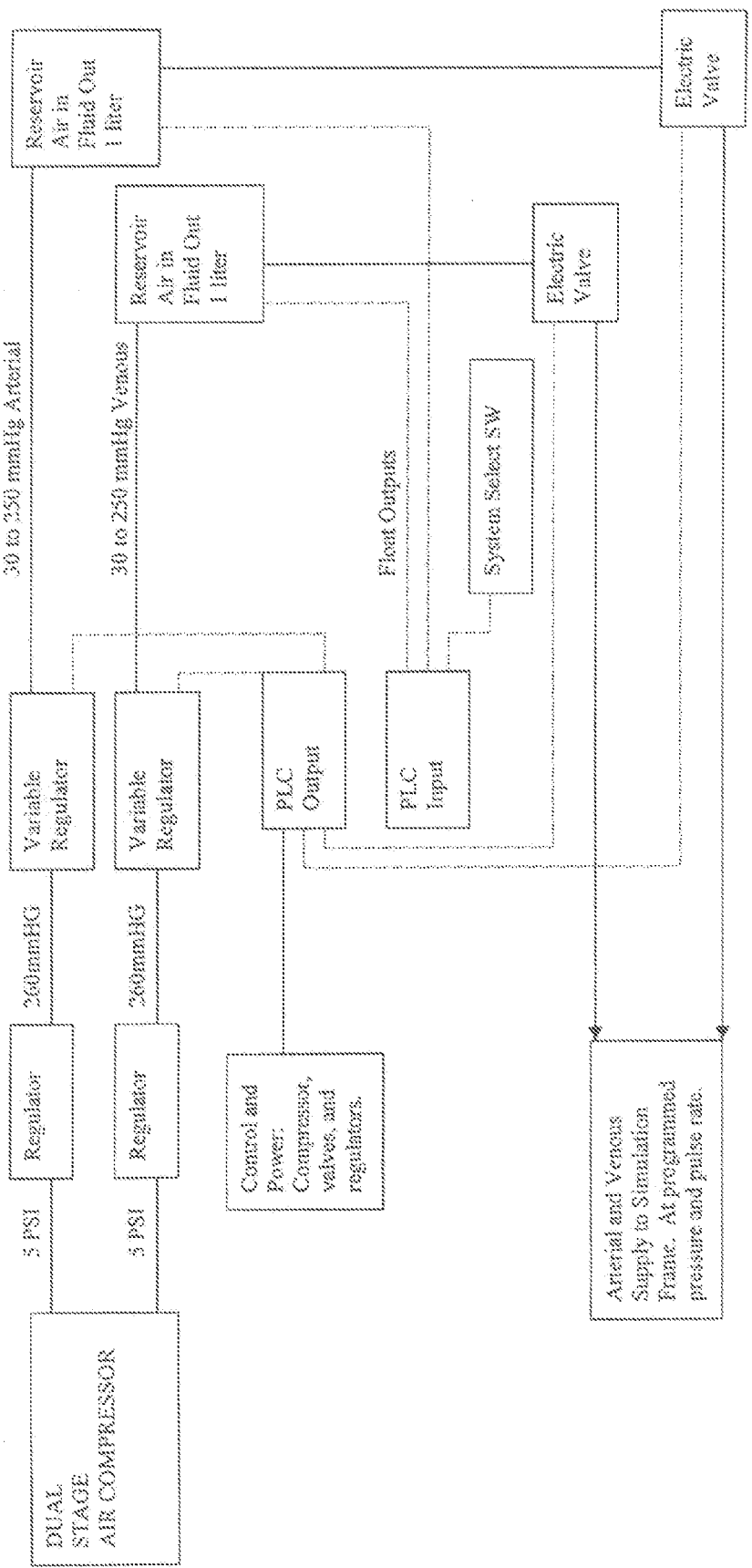
FIG. 12 is a schematic block diagram illustrating the various components and processes of a hemodynamic simulator of the invention and their relationships.
Figure 13:
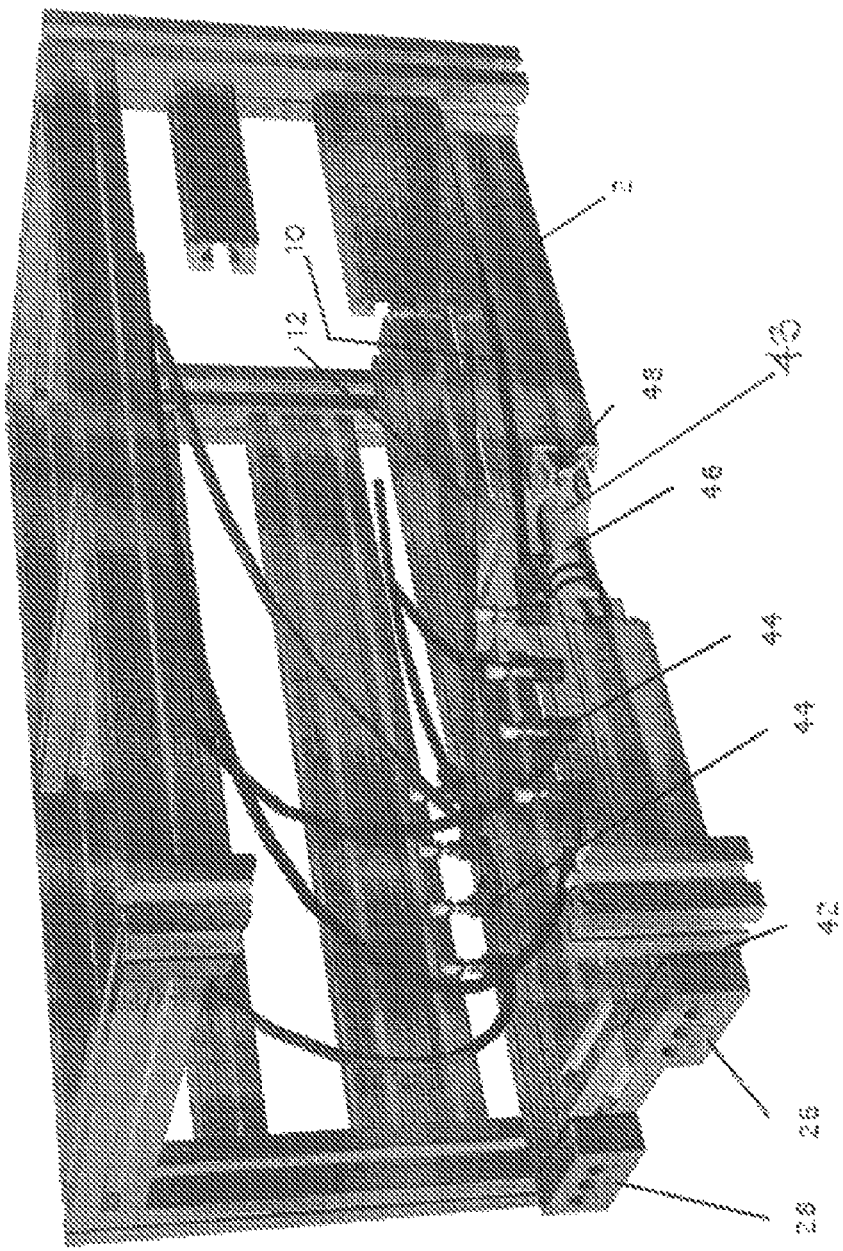
FIG. 13 is a partial cutaway view of a frame assembly 2 of the invention with associated components of a hemodynamic simulator.
Figure 14:
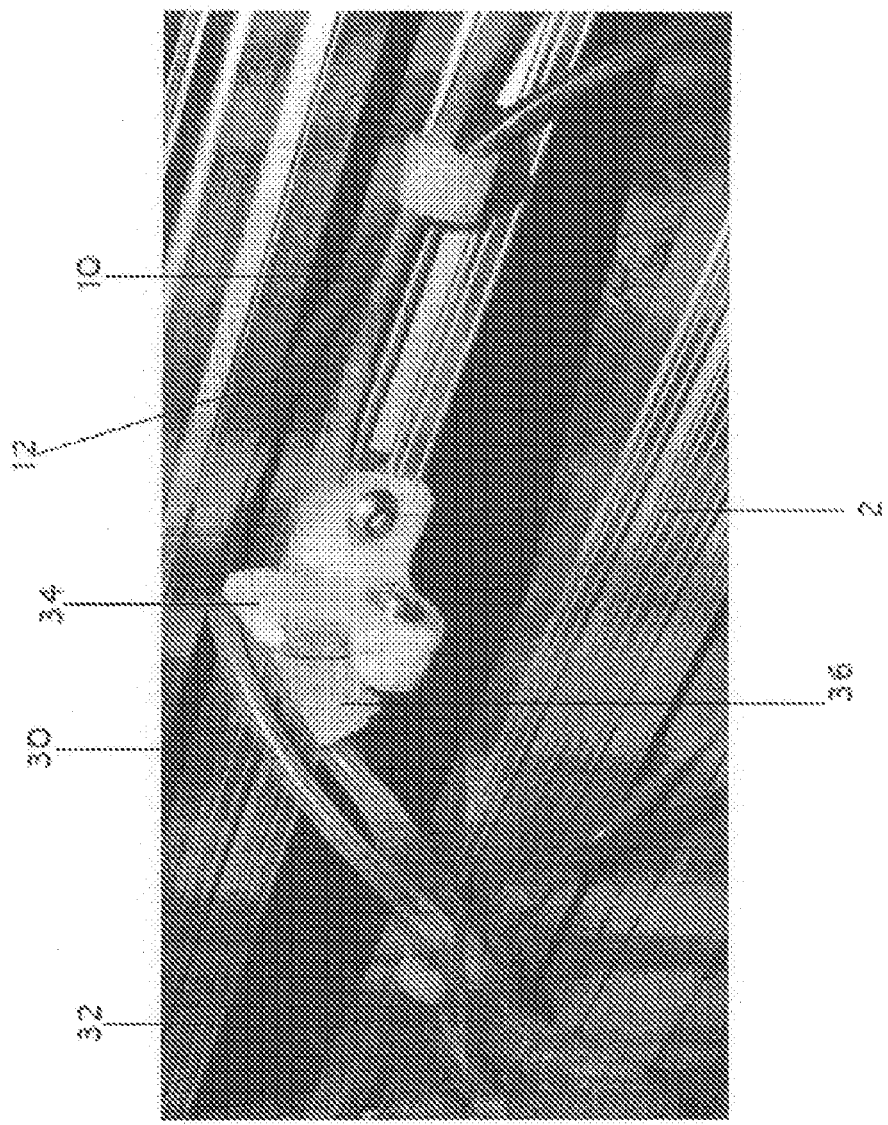
FIG. 14 is a photograph of a simulated vein 10 and a simulated artery 12 of a hemodynamic simulator of the invention fluidly attached to a corresponding simulated vein 30 or artery of a simulated organ 32 of the invention. Also shown is a means 34 for attaching a ligament 36 (shown cut away) to the frame assembly 2.

A hemodynamic simulator of the invention is described in FIG. 10 through FIG. 12. "Cardiovascular system simulators" found in the art generally rely upon pumps (e.g., peristaltic pumps) to provide simulated blood flow to simulated organs. The inventors have discovered that the combination of one or more single-, dual-, or multi-phase air compressor(s) with at least one pressurized fluid reservoir or accumulator may be used to provide a hemodynamic simulator that much more accurately simulates the "real life" situation of variable blood pressures and pulse rates between patients, and variation between the variable pressure of the arterial blood vessels and the more continuous pressure of the venous blood vessels, than do current systems. As described in FIG. 12, the output of the hemodynamic simulator is fluidly connected to the simulation frame using a dual diaphragm compressor supplying 5 PSI to the simulated organs and/or tissues via dual pressure outputs regulated to a maximum pressure of 260 mmHg using fixed pressure regulators. These dual outputs become the arterial and venous pressure lines. A set of electronically controlled regulators is employed on each line to set the arterial and venous pressures. These regulators are controlled by a programmable logic controller (PLC) or an external input to set the pressure levels from 30 mmHg to 250 mmHg. This pressure is then provided to a dual set of fluid reservoirs. The fluid is then driven from the reservoirs at programmed head pressures. The reservoirs contain a float to provide indication of fluid level and the PLC will turn off the simulator should the fluid level drop below an acceptable level. A set of electronic valves are employed on both the arterial and venous sides to pulse the outputs on and off to simulate a pulse rate. These electronic valves are also controlled by the PLC or external input. Silicone or other acceptable tubing is then used to couple the arterial and venous lines to the surgical simulation frame, the venous flow being directed to the anatomical cassette by means of a manifold fitting 26 as shown in FIG. 13, with the venous line from the hemodynamic simulator being fluidly connected to the manifold fitting 26 and the arterial line from the hemodynamic simulator being fluidly connected to the manifold fitting 28, the manifold fitting 26 or 28 being associated with gasket 42 to form a fluid-tight fitting to connect the simulated blood flow from the hemodynamic simulator to a cylindrical passage 43 (cutaway in FIG. 13) in the frame assembly 2. Seated within the cylindrical passage is an internal cylindrical plug 46 having O-ring seals secured with set screws, the internal cylindrical plug being repositioned as desired to limit the area of the cylindrical passage into which the simulated blood will flow. At least one variable-flow quick-connect 44 communicates the arterial or venous blood flow from the cylindrical passage to veins 10 and arteries 12 comprising flexible tubing, the corresponding tubing 30 from a removable, reusable or disposable anatomical cassette 32, representing the appropriate artery or vein, being fluidly attached to arterial 12 and venous 10 vessels associated with the frame assembly 2 as shown in FIG. 14. Also shown in FIG. 14 is a ligament attachment means 34 as described previously and shown in FIG. 6, with dissected ligament 36 attached.

A surgical simulator as described by the invention may be utilized for surgeries associated with the abdominopelvic region, as described by the examples herein. However, it will be apparent to those of skill in the art that such a simulator is readily adaptable for thoracic surgical procedures, and that a simulator as described by the invention is appropriate for use in teaching, practicing, or evaluating veterinary surgical techniques as well as human surgical techniques. It will also be apparent to those of skill in the art that such a simulator is readily adaptable and appropriate for teaching, practicing, and evaluating surgical techniques involving the male reproductive system and gender-neutral surgical techniques such as organ transplant, bowel resection, and implantation of organ slings, for example.

A hemodynamic simulator of the invention may be particularly effective for use in simulations of thoracic (e.g., cardiovascular) surgeries involving dissection and ligation of multiple blood vessels, including both arterial and venous vessels.

A frame assembly as described herein provides a reusable support for reusable organs, if needed, but more importantly may provide a reusable support for consumable or disposable organs, allowing users to purchase anatomical cassettes that may be dissected as a result of the teaching or practicing of a particular surgical technique, but replaced with a substantially identical but new set of organs when needed for the next simulation. The "cassette" of organs provided by an anatomical cassette may also comprise sets of organs comprising particular organ anomalies to provide instruction or practice related to certain surgical techniques such as, for example, ectopic pregnancy or removal of a tumor.

The method for forming the anatomical cassette also provides organs with a realistic texture and consistency, providing a more realistic resistance to dissection, for example. Surgical simulators provide by the invention are appropriate for use in hospitals, medical schools, research institutions, veterinary schools and hospitals, and other institutions where surgical techniques are taught and/or practiced.

The associated recording system provides both instructor and student with an opportunity to review and evaluate surgical skills, to note strengths and weaknesses in a user's ability to manipulate a more life-like set of tissues in an environment where access is limited, as is the view of the surgical field. The hemodynamic simulator adds the opportunity to utilize a more "real-world" simulation because surgeries generally require manipulation and ligation of blood vessels, a task that must be completed effectively and swiftly. The hemodynamic simulator stresses the ligated vessel, which is generally not accomplished by systems that utilize peristaltic pumps to circulate simulated blood through simulated vessels. In the present system, a user will be able to note whether a vessel is effectively ligated or is "bleeding out."

Particular embodiments of the invention and its component parts have been described, but those of skill in the art may readily make substitutions to a variety of components in the described invention, given the present disclosure as a guide, to provide a surgical simulator having utility in a variety of settings and uses.

What is claimed is:

1. A surgical simulator comprising a frame assembly, a hemodynamic simulator fluidly connected to the frame assembly, and an anatomical cassette fluidly connected to the frame assembly and hemodynamic simulator;
   wherein the hemodynamic simulator is adapted to provide variable pressure flow of simulated blood to simulated arteries in the anatomical cassette and continuous pressure flow of simulated blood to simulated veins in the anatomical cassette; and
   wherein the surgical simulator is programmable to provide variable rates of simulated blood pulse and pressure.

2. The surgical simulator of claim 1 further comprising a recording system.

3. A surgical simulator as in claim 2 wherein the recording system comprises at least one visible/infrared spectrum camera.

4. A surgical simulator as in claim 1 wherein the anatomical cassette comprises a uterus, ligaments, and blood vessels.

5. A hemodynamic simulator as in claim 1 comprising at least one air compressor and at least one pressurized fluid reservoir or accumulator.

6. A hemodynamic simulator as in claim 5 further comprising at least one regulator.

7. A surgical simulator, comprising:
   a frame assembly;
   a hemodynamic simulator comprising at least one air compressor and at least one pressurized fluid reservoir or accumulator, the hemodynamic simulator fluidly connected to the frame assembly; and
   an anatomical cassette comprising simulated arteries, veins, and one or more of organs, tissues, and ligaments of an anatomical system, the anatomical cassette fluidly connected to the frame assembly and the hemodynamic simulator;
   wherein the frame assembly is adapted to be a conduit through which simulated blood may flow between the hemodynamic simulator and the anatomical cassette; and
   wherein the hemodynamic simulator is adapted to provide variable pressure flow of simulated blood to the arteries in the anatomical cassette and continuous pressure flow of simulated blood to the veins in the anatomical cassette; and
   wherein the hemodynamic simulator is programmable to provide variable rates of simulated blood pulse and pressure.

8. A surgical simulator as in claim 7, wherein the anatomical cassette comprises simulated arteries, veins, and one or more of organs, tissues, and ligaments of an anatomical system associated with the mammalian abdominopelvic region.

9. A surgical simulator as in claim 8, wherein the anatomical system is the human reproductive system.

10. A surgical simulator as in claim 9, wherein the anatomical cassette further comprises one or more of simulated arteries, veins, organs, tissues, or ligaments of another anatomical system that is proximally positioned in the human body to the reproductive system.

11. A surgical simulator as in claim 10, wherein the reproductive system is the female reproductive system and the anatomical cassette comprises one or more of simulated uterus, ovary, fallopian tube, vagina, cervix, bladder, peritoneum, and omentum.

12. A surgical simulator as in claim 10, comprising a simulated pelvis and optionally, one or two simulated legs.

13. A surgical simulator as in claim 7, wherein the anatomical cassette comprises simulated arteries, veins, and one or more of organs, tissues, and ligaments of an anatomical system associated with the human thoracic region.

14. A surgical simulator, comprising:
   a frame assembly;
   a hemodynamic simulator comprising at least one air compressor and at least one pressurized fluid reservoir or accumulator, the hemodynamic simulator fluidly connected to the frame assembly; and
   an anatomical cassette comprising (i) simulated arteries, veins, and one or more of organs, tissues, and ligaments of a human reproductive system; and (ii) one or more of simulated arteries, veins, organs, tissues, or ligaments of another anatomical system that is proximally positioned in the human body to the reproductive system; the anatomical cassette mechanically and fluidly connected to the frame assembly and fluidly connected to the hemodynamic simulator;

wherein the frame assembly is adapted to be a conduit through which simulated blood may flow between the hemodynamic simulator and the anatomical cassette; and wherein the hemodynamic simulator is adapted to provide variable pressure flow of simulated blood to the arteries in the anatomical cassette and continuous pressure flow of simulated blood to the veins in the anatomical cassette; and wherein the hemodynamic simulator is programmable to provide variable rates of simulated blood pulse and pressure.

15. A surgical simulator as in claim 14, wherein the reproductive system is the female reproductive system and the anatomical cassette comprises one or more of simulated uterus, ovary, fallopian tube, vagina, cervix, bladder, peritoneum, and omentum.

* * * * *